United States Patent
Guo et al.

(10) Patent No.: US 11,708,527 B1
(45) Date of Patent: Jul. 25, 2023

(54) METHODS FOR PREPARING LIQUID-SOLID PHASE CHANGE PROPPANT WITH A CONTROLLABLE PARTICLE SIZE BASED ON EMULSIFIED RESIN

(71) Applicant: CHINA UNIVERSITY OF PETROLEUM (EAST CHINA), Shandong (CN)

(72) Inventors: Tiankui Guo, Qingdao (CN); Ming Chen, Qingdao (CN); Jiacheng Fan, Qingdao (CN); Yunpeng Wang, Qingdao (CN); Caili Dai, Qingdao (CN); Jianchun Xu, Qingdao (CN); Hangyu Li, Qingdao (CN); Xiaoqiang Liu, Qingdao (CN); Wei Zhang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 17/823,075

(22) Filed: Aug. 29, 2022

(30) Foreign Application Priority Data

Feb. 22, 2022 (CN) .......................... 202210159197.8

(51) Int. Cl.
*C09K 8/80* (2006.01)
*C09K 8/584* (2006.01)

(52) U.S. Cl.
CPC ................ *C09K 8/80* (2013.01); *C09K 8/584* (2013.01); *C09K 2208/06* (2013.01)

(58) Field of Classification Search
None
See application file for complete search history.

(56) References Cited

U.S. PATENT DOCUMENTS

2019/0345377 A1* 11/2019 Haque ................. C04B 41/4558

FOREIGN PATENT DOCUMENTS

| CN | 102127417 A | 7/2011 |
| CN | 104449203 A | 3/2015 |

(Continued)

OTHER PUBLICATIONS

First Office Action in Chinese Application No. 202210159197.8 dated Apr. 1, 2022, 8 pages.

(Continued)

*Primary Examiner* — Andrew Sue-Ako
(74) *Attorney, Agent, or Firm* — Metis IP LLC

(57) ABSTRACT

Some embodiments of the present disclosure provide a method for preparing a self-phase change proppant based on an emulsified and toughened bio-based epoxy resin. Toughening modification is performed on the bio-based epoxy resin by graphite particles, and then the bio-based epoxy resin after the toughening modification is emulsified by $SiO_2$ particles as an emulsifier to prepare the self-phase change proppant; a proportion of different mesh numbers in the self-phase change proppant is adjusted by changing a concentration of the emulsifier during emulsification; and the chemical formula of the bio-based epoxy resin is:

(Continued)

The proppant particles in the present disclosure have good sphericity and high fracture permeability after being laid, which can effectively extract the remaining oil in the fractures, thus improving the development efficiency of the oilfield.

9 Claims, 14 Drawing Sheets

(56) References Cited

FOREIGN PATENT DOCUMENTS

| | | |
|---|---|---|
| CN | 208121006 U | 11/2018 |
| CN | 109824866 A | 5/2019 |
| CN | 110003881 A | 7/2019 |

OTHER PUBLICATIONS

Decision to Grant a Patent in Chinese Application No. 202210159197.8 dated Apr. 26, 2022, 3 pages.

\* cited by examiner

METHODS FOR PREPARING LIQUID-SOLID PHASE CHANGE PROPPANT WITH A CONTROLLABLE PARTICLE SIZE BASED ON EMULSIFIED RESIN

CROSS-REFERENCE TO RELATED APPLICATIONS

This application claims priority of Chinese Patent Application No. 202210159197.8, filed on Feb. 22, 2022, the entire contents of which are incorporated herein by reference.

TECHNICAL FIELD

The present disclosure generally relates to a field of the technology of the oilfield development, and in particular, to a method for preparing a self-phase change proppant based on an emulsified and toughened bio-based epoxy resin.

BACKGROUND

Hydraulic fracturing technology has been widely used in major oilfields as the main technical means of reservoir renovation and enhancement of oil recovery. In hydraulic fracturing technology, the injection of solid proppant to prevent the fractures from reclosing is the key to ensuring high conductivity of fractures. At present, the commonly used solid proppant in oilfields includes quartz sand, ceramsite, etc. Due to the high density of quartz sand, ceramsite, etc., highly viscous sand-laden fluid usually needs to carry the solid proppant effectively, so there are limitations in the use process. Secondly, to achieve the best development effect, the current oilfield adopts the method of adding sand in different sections to prop up the fractures, that is, adding small-sized proppant first to prop up the distal fractures and the branch fractures, then adding large-sized proppant to prop up the main fractures and the near-well fractures, and the process of adding sand multiple times leads to the increase of construction technology and construction cost.

Therefore, there is a need to provide a method for preparing a self-phase change proppant, which is used for preparing the self-phase change proppant in low density that contains proppant particles of different particle sizes to meet the requirements of being laid in different sections.

SUMMARY

To solve the problems of the poor migration capacity of conventional solid proppant and complex process of being laid in different sections in the existing technology, some embodiments of the present disclosure provide a method for preparing a self-phase change proppant based on an emulsified and toughened bio-based epoxy resin.

To solve the above technical problems, some embodiments of the present disclosure adopt the following technical solutions. A method for preparing a self-phase change proppant based on an emulsified and toughened bio-based epoxy resin, and toughening modification is performed on the bio-based epoxy resin by graphite particles, and then the bio-based epoxy resin after the toughening modification is emulsified by $SiO_2$ particles as an emulsifier to prepare the self-phase change proppant; a proportion of different mesh numbers in the self-phase change proppant is adjusted by changing a concentration of the emulsifier during emulsification; and the chemical formula of the bio-based epoxy resin is:

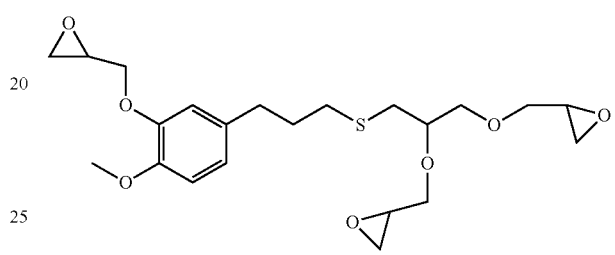

A method for preparing a self-phase change proppant based on an emulsified and toughened bio-based epoxy resin includes the following steps.

S1, preparing the bio-based epoxy resin.

S2, performing the toughening modification on the bio-based epoxy resin by using the graphite particles.

S3, using the $SiO_2$ particles as the emulsifier to emulsify the bio-based epoxy resin after the toughening modification to prepare the self-phase change proppant that is laid in sections.

In S2, a mass concentration of the graphite particles is 1%-7%.

In S2, a mass concentration of the graphite particles is 1%-5%.

In S2, a mass concentration of the graphite particles is 3%.

In S2, an average particle size of the graphite particles is 40 μm.

In S3, a particle size of the $SiO_2$ particles is 50 nm.

In S3, a mass concentration of the $SiO_2$ particles is 0.3-1%.

Bio-based epoxy resin is prepared as follows:

S101, using dimethyl sulfoxide as a solvent, placing eugenol and 1-thioglycerol with a molar ratio of 1:1 and a catalyst 4-dimethylaminopyridine (DMAP) with a total mass of 2% of the reaction monomers in the solvent and heating them at 65° C. for 4 h to obtain a first product.

S102, reacting the first product and epichlorohydrin in an ethanol solution with a NaOH mass concentration of 10% at 85° C. for 6 h to obtain a second product, wherein the reaction formula is:

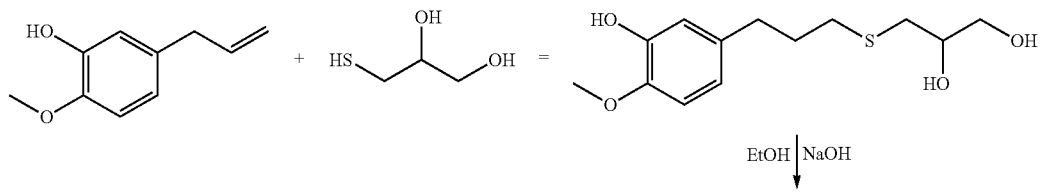

-continued

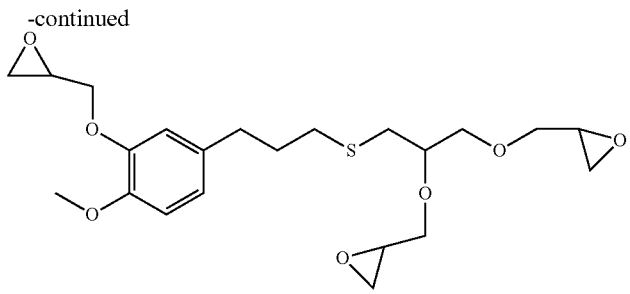

S103, using a saturated sodium bicarbonate solution to purify the second product to obtain the target bio-based epoxy resin.

A viscosity and a density of the bio-based epoxy resin at 20° C. are 4620 mPa·s and 1.2 g/cm³, respectively.

Some embodiments of the present disclosure have the following beneficial effects over prior art.

(1) Some embodiments of the present disclosure provide the self-phase change proppant based on an emulsified and toughened bio-based epoxy resin, which is easy to prepare, low in cost, stable in performance, capable of significantly reducing surface and interfacial tension, and has a low concentration during use. Moreover, the self-phase change proppant can effectively reduce the use of polymer surfactants which used to reduce oil viscosity, and can effectively exploit the remaining oil in formation fractures, thereby improving the development efficiency of the oilfield.

(2) The self-phase change proppant based on an emulsified and toughened bio-based epoxy resin of some embodiments of the present disclosure has good migration ability and can meet the requirements of being laid in different sections. Due to the good sphericity of curing phase change proppant particles, the fracture permeability of the curing phase change proppant after being laid is better than that of quartz sand and ceramsite proppants with the same particle size.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

To make the technical solutions and advantages of the present disclosure clearer, the technical solutions of the present disclosure will be clearly and completely described below with reference to specific embodiments and accompanying drawings. Obviously, the described embodiments are only some of the embodiments of the present disclosure, but not all of the embodiments. Based on the embodiments in the present disclosure, all other embodiments obtained by the ordinary skilled in the art without creative efforts shall fall within the protection scope of the present disclosure.

The embodiments of the present disclosure provide a method for preparing a self-phase change proppant based on an emulsified and toughened bio-based epoxy resin. The method includes the following steps: S1, preparing the bio-based epoxy resin; S2, performing the toughening modification on the bio-based epoxy resin by using the graphite particles; S3, using the SiO₂ particles as the emulsifier to emulsify the bio-based epoxy resin after the toughening modification to prepare the self-phase change proppant that is laid in sections.

In some embodiment, the method for preparing the bio-based epoxy resin in Si may include the following steps.

S101, using dimethyl sulfoxide as a solvent, placing eugenol and 1-thioglycerol with a molar ratio of 1:1 and a catalyst 4-dimethylaminopyridine (DMAP) with a total mass of 2% of the reaction monomers (e.g., the eugenol and 1-thioglycerol) in the solvent, and heating them at 65° C. for 4 h to obtain a first product.

S102, reacting the first product and epichlorohydrin in an ethanol solution with a NaOH mass concentration of 10% at 85° C. for 6 h to obtain a second product.

S103, using a saturated sodium bicarbonate solution to purify the second product to obtain the target bio-based epoxy resin.

Figure 1:
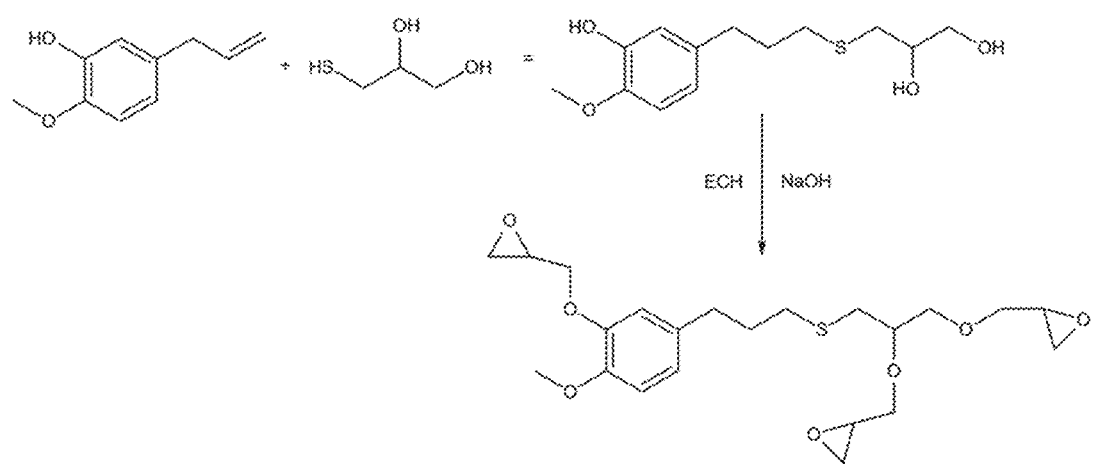
FIG. 1 illustrates the reaction formula of synthetizing a bio-based epoxy resin according to some embodiments of the present disclosure.

The synthetic reaction formula of bio-based epoxy resin is shown in FIG. 1.

In some embodiment, the chemical formula of the bio-based epoxy resin is:

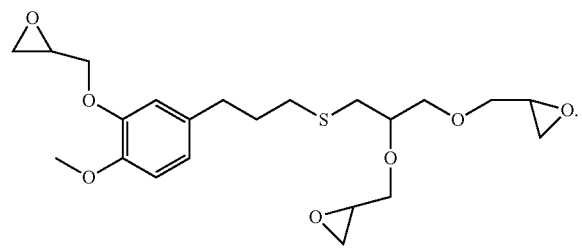 [SMILES: COc1ccc(CCCSCC(COCC2CO2)OCC2CO2)cc1OCC1CO1]

In some embodiments, the molar ratio of eugenol and 1-thioglycerol may range from 2:1 to 1:2. In some embodiments, the mass percentage of catalyst 4-dimethylaminopyridine (DMAP) may be 1% to 5% of the total mass of the reaction monomers. In some embodiments, using dimethyl sulfoxide as a solvent, placing eugenol and 1-thioglycerol with a molar ratio of 1:1 and a catalyst 4-dimethylaminopyridine (DMAP) with a total mass of 2% of the reaction monomers in the solvent, and heating them at 60~80° C. for 4 h to obtain a pale yellow product. In some embodiments, reacting the pale yellow product with epichlorohydrin in an ethanol solution with a NaOH mass concentration of 5-15%. In some embodiments, the reaction temperature of the pale yellow reaction product and epichlorohydrin in an ethanol solution with a NaOH mass concentration of 10% may be 80~100° C. For details, refer to embodiment 1.

The synthesis method uses low reaction temperature and short reaction time, and can effectively prepare bio-based epoxy resins using mild reaction conditions.

In some embodiment, a viscosity and a density of the bio-based epoxy resin at 20° C. are 450~4700 mPa·s and 1.1~1.3 g/cm$^3$, respectively. In some embodiment, the viscosity and the density of the bio-based epoxy resin at 20° C. are 4620 mPa·s and 1.2 g/cm$^3$, respectively.

In some embodiments, after the bio-based epoxy resin is prepared, the toughening modification may be performed on it. For example, rubber elastomers, core-shell polymers, thermoplastics (TP), thermotropic liquid crystal polymers (TLCP), and/or nanoparticles are added to bio-based epoxy resins for the toughening modification. Nanoparticles may include graphite particles, silica particles, and the like. In some embodiments, the bio-based epoxy resin may be toughened by graphite particles. Before the bio-based epoxy resin is cured, the bio-based epoxy resin may be subjected to the toughening modification by a physical method of adding graphite particles therein. The use of graphite particles to perform the toughening modification on the bio-based epoxy resin can make the bio-based epoxy resin have greater compressive strength and higher toughness. For details, refer to embodiment 2.

Figure 5:
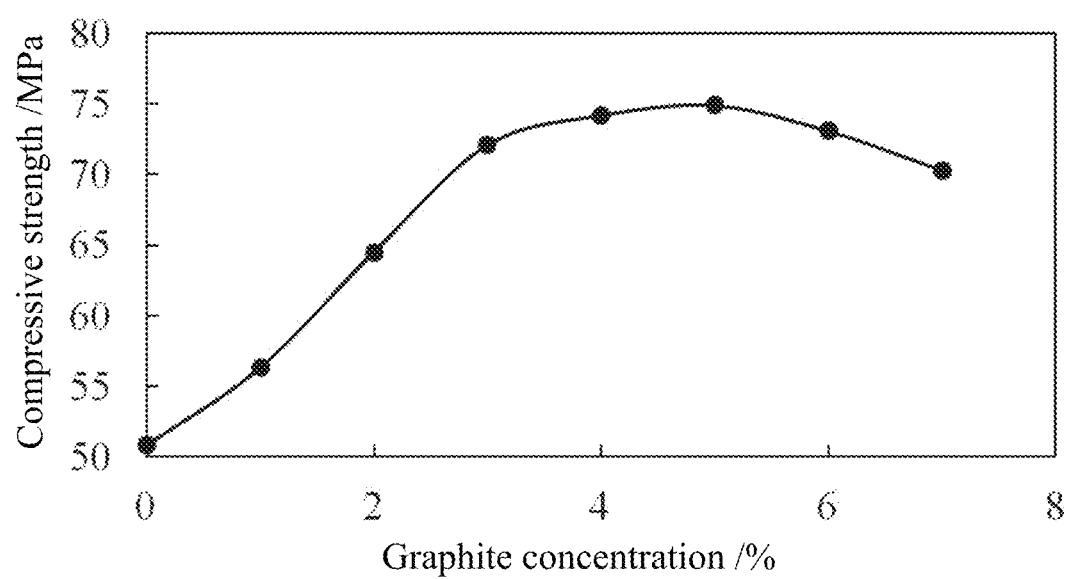
FIG. 5 is a graph illustrating a variation law of compressive strength of the bio-based epoxy resin with graphite concentration according to some embodiments of the present disclosure.

In some embodiments, graphite particles with an average particle size of 10~70 μm and a mass concentration of 0.5%~10% may be added to the bio-based epoxy resin for the toughening modification. In some embodiments, graphite particles with an average particle size of 10~70 μm and a mass concentration of 1%-7% may be added to the bio-based epoxy resin for the toughening modification. In some embodiments, graphite particles with an average particle size of 10~70 μm and a mass concentration of 1%~5% may be added to the bio-based epoxy resin for the toughening modification. As shown in FIG. 5, when the mass concentration of graphite particles is lower than 5%, the compressive strength of the bio-based epoxy resin increases with the increase of the mass concentration of graphite particles. The mass concentration of graphite particles increased from 0% to 5%, and the compressive strength of the bio-based epoxy resin increased from 50.8 MPa to 74.0 MPa. However, as the mass concentration of graphite particles continues to increase, the compressive strength of the bio-based epoxy resins decreases. When the mass concentration of graphite particles increased to 7%, the compressive strength of the bio-based epoxy resin decreases to 70.3 MPa. In some embodiments, the mass concentration of graphite particles used may be lower than 5%, for example, 2%, 3%, 4%, 5%, etc.

In some embodiments, graphite particles with an average particle size of 20~60 μm, 30~50 μm etc., may also be added to the bio-based epoxy resin for the toughening modification. In some embodiments, graphite particles with an average particle size of 30 μm, 40 μm, 50 μm etc., may also be added to the bio-based epoxy resin for the toughening modification.

In some embodiments, graphite particles with an average particle size of 40 μm and a mass concentration of 5% may be added to the bio-based epoxy resin for the toughening modification. In some embodiments, graphite particles with an average particle size of 40 μm and a mass concentration of 4% may be added to the bio-based epoxy resin for the toughening modification. In some embodiments, graphite particles with an average particle size of 40 μm and a mass concentration of 3% may be added to the bio-based epoxy resin for the toughening modification.

The distribution of graphite particles in bio-based epoxy resin may affect the compressive strength of the bio-based epoxy resin. Therefore, by selecting graphite particles with appropriate mass concentration to perform the toughening modification on the bio-based epoxy resin, the bio-based epoxy resin with the strong compressive strength can be prepared. For details on the influence of graphite particles on the compressive strength of the bio-based epoxy resin, refer to embodiment 2, FIG. 5 and related descriptions.

After obtaining the bio-based epoxy resin on which the toughening modification is performed, an emulsifier (e.g., $SiO_2$ particles) may be used to emulsify the bio-based epoxy resin to obtain a self-phase change proppant. The self-phase change proppant refer to proppant that may change from a liquid-phase proppant to a solid-phase proppant.

In some embodiments, $SiO_2$ particles with a particle size of 10~100 nm may be selected as the emulsifiers. In some embodiments, $SiO_2$ particles with a particle size of 10 nm, 30 nm, 50 nm, 70 nm, 90 nm may be selected as the emulsifiers. The preparation of self-phase change proppant is carried out by Pickering emulsification technique. $SiO_2$ particles with a particle size of 50 nm is moderate, as an emulsifier, it may effectively prepare a bio-based epoxy resin proppant containing proppant particles with different particle sizes, which can meet the requirements of proppant mesh numbers for propping up the near-well fractures, main fractures and branch fractures at the same time, and meet the needs of being laid in different sections.

In some embodiments, a proportion of different mesh numbers in the self-phase change proppant is adjusted by changing a concentration of the emulsifier during emulsification. The average particle size of the self-phase change proppant decreases with the increase of the emulsifier concentration. When the emulsifier concentration is selected from 0.3% to 1%, the different mesh proportions in the self-phase change proppant are different. When the emulsifier concentration is 0.3%, the self-phase change proppant with the largest proportion is the 12-mesh self-phase change proppant. When the emulsifier concentration rises to 0.7%, the 20-mesh self-phase change proppant occupies the largest proportion. When the emulsifier concentration is 1%, the largest proportion becomes the self-phase change proppant with a particle size of 80 mesh. The self-phase change proppant with different mesh numbers may be obtained by selecting the emulsifier concentration according to the site requirements. By changing the emulsifier concentration, the obtained proppant may be suitable for different reservoir environments, and the application range is expanded. For example, the large-size proppant (e.g., in 12 mesh) may sediment rapidly in the near-well reservoir to prop up the near-well fractures, the 20-mesh proppant may sediment in the main fractures to prop up the main fractures, and the small-size proppant (e.g., in 80 mesh) does not sediment in the near-well fractures and the main fractures, and can effectively prop up the distal fractures and branch fractures, thereby meeting the needs of being laid in different sections.

In some embodiments, the self-phase change proppant may be prepared by emulsification of bio-based epoxy resins with $SiO_2$ particles at a concentration of 0.7% as an emulsifier.

The self-phase change proppant prepared under the above condition is suitable, for example, for use in deep wells with high closure pressures. The self-phase change proppant has sufficient compressive strength and resistance to wear, and the relative density of the self-phase change proppant particles is low. Therefore, the self-phase change proppant is suitable for remote fractures and branch fractures while ensuring that the proppant can withstand the high pressure and friction during injection. In addition, the rapid sedimentation of the large particle proppant can also prevent the self-phase change proppant from clogging tiny fractures.

In some embodiments, the self-phase change proppant may be prepared by emulsification of bio-based epoxy resins with $SiO_2$ particles at a concentration of 1% as an emulsifier.

The self-phase change proppant prepared under the above condition is suitable for use, for example, in vertical fractures in deep wells. The proppant particles with smaller mesh numbers sediment faster and are unevenly laid longitudinally in the vertical fractures, which may affect the effect of propping up. Therefore, when the fracture length is long, the proppant particles obtained by increasing the emulsifier concentration have large mesh numbers and a slow sedimentation speed, which is favorable for being evenly laid in the longitudinal direction of the vertical fracture. At the same time, the self-phase change proppant prepared under the above condition has better sedimentation and migration ability in longer fractures, and can be evenly laid on the fractures when the viscosity of the fracturing fluid is low (e.g., 1 mPa·s), avoiding adjustment fracturing fluid viscosity, thereby improving the construction efficiency.

In some embodiments, the effectiveness of the proppant may be evaluated by evaluating the migration ability of the liquid phase proppant and the fracture permeability of the solid phase proppant. The liquid phase change proppant has good migration ability and can achieve the effect of being laid in different sections, and the solid phase proppant has good fracture permeability, compressive strength and temperature resistance. For details, refer to embodiment 4.

Embodiments

The experimental methods in the following embodiments are conventional methods unless otherwise specified. The test materials used in the following embodiments were purchased from conventional biochemical reagent companies unless otherwise specified.

Embodiment 1: the preparation and evaluation of the bio-based epoxy resin.

(1) The preparation of the bio-based epoxy resin.

Figure 2:
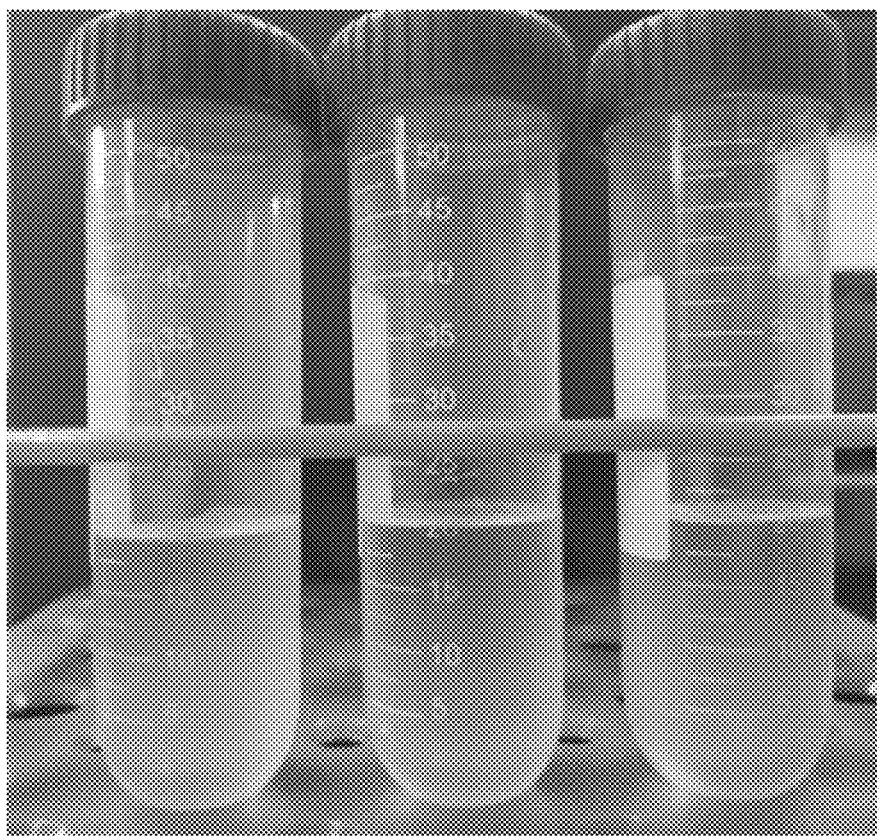
FIG. 2 is a graph illustrating a product form of the bio-based epoxy resin according to some embodiments of the present disclosure.

Using dimethyl sulfoxide as a solvent, placing eugenol and 1-thioglycerol with a molar ratio of 1:1 and a catalyst 4-dimethylaminopyridine (DMAP) with a total mass of 2% of the reaction monomers in the solvent, and heating them at 65° C. for 4 h to obtain a pale yellow product. Reacting the pale yellow product and epichlorohydrin in an ethanol solution with a NaOH mass concentration of 10% at 85° C. for 6 h, then being purified by using a saturated sodium bicarbonate solution to obtain the target bio-based epoxy resin. The reaction formula and the morphologies of the products are shown in FIG. 1 and FIG. 2, respectively.

(2) The evaluation of the prepared bio-based epoxy resin.

1. Viscosity and density evaluation of the bio-based epoxy resin.

First, the viscosity of the prepared bio-based epoxy resin was evaluated using an Anton Pa rheometer at temperatures of 20° C., 40° C., 60° C. and 80° C. with a shear rate of 30/s. Subsequently, the density is obtained by measuring the mass of the bio-based epoxy resin per unit volume.

TABLE 1

Density and viscosity changes of the bio-based epoxy resin obtained at different temperatures

| No. | Temperature/° C. | Viscosity/mPa · s | Density/g·cm$^3$ |
| --- | --- | --- | --- |
| 1 | 20 | 4620 | 1.2 |
| 2 | 40 | 1625 | 1.2 |
| 3 | 60 | 686 | 1.2 |
| 4 | 80 | 428 | 1.2 |

It can be seen from the results in Table 1 that the viscosity of the prepared bio-based epoxy resin at 20° C. is 4620 mPa·s, which is much lower than that of bisphenol-A epoxy resin (11000 mPa·s). The viscosity of the prepared bio-based epoxy resin is very sensitive to temperatures and decreases to 686 mPa·s when the temperature rises above 60° C. The density of bio-based epoxy resin remains constant at 1.2 g/cm$^3$, which is lower than conventional epoxy resin (1.6 g/cm$^3$) and traditional solid proppant (quartz sand: 2.2~2.3 g/cm$^3$, ceramsite: 1.7~1.9 g/cm). The decrease in density and viscosity of the bio-based epoxy resin is due to the existence of branched chains with epoxy groups in the molecular structure of the bio-based epoxy resin, and the three-dimensional structure formed when the molecular chains are stacked. Because of the low viscosity of the prepared bio-based epoxy resin, an emulsion formulated from it has higher stability; its low density makes the phase change proppant prepared from it have better migration ability.

2. Determination of epoxy value of the bio-based epoxy resin.

Epoxy value is the amount of epoxy group contained in 100 g of epoxy resin, which is the main index for evaluating the performance of epoxy resin. Using the hydrochloric acid-acetone method, the epoxy value of the prepared bio-based epoxy resin is evaluated by measuring the amount of hydrochloric acid reacted with a certain amount of epoxy resin. The calculation method of epoxy value is:

$$EPV = \frac{(V_0 - V)C}{10W} \quad (1\text{-}1)$$

where V denotes volume of NaOH solution consumed by a sample, mL; $V_0$ denotes volume of NaOH solution consumed by a blank sample, mL; C denotes NaOH solution concentration, mol/L; W denotes sample mass, g.

The epoxy value of the prepared bio-based epoxy resin by calculation is about 0.53 g/Eq, which has a high epoxy value. Therefore, less curing agent is required in the curing process, the application cost is low, and the curing product has high hardness but poor toughness. Therefore, the toughening modification should be performed on the bio-based epoxy resin to increase its compressive strength before application.

Embodiment 2: the toughening modification of the bio-based epoxy resin.

To overcome the defects of poor toughness and notch sensitivity of the bio-based epoxy resin, and to make the proppant prepared based on the prepared bio-based epoxy resin have better compressive strength, the prepared bio-based epoxy resin is performed the toughening modification by a physical method of adding organic components or inorganic rigid particles to the bio-based epoxy resin before curing. By evaluating the physical properties of the bio-based epoxy resin after curing, the optimal type and dosage of added particles are selected. The epoxy-resin-curing agent used in the evaluation experiment is an adduct of diethylenetriamine and butyl glycidyl ether with a good curing ability in a wet environment. The curing agent has a good curing ability in a wet environment, so that when its dosage is 25% of the mass of the epoxy resin, the epoxy resin may be fully cured within 40 min at an ambient temperature of 60° C., which meets the requirements of propping up reservoirs after field fracturing.

(1) Selection of the materials for performing the toughening modification.

To evaluate the impact of different materials for performing the toughening modification on the compressive strength of the bio-based epoxy resin, rubber elastomer particles, rigid graphite particles and silica particles, with an average particle size of 40 µm and a mass concentration of 3% of the resin, are selected to toughen and modify the prepared bio-based epoxy resin. The optimal material for performing the toughening modification may be selected by evaluating the compressive strength of the toughened resin. The results of the evaluation experiment are shown in FIG. 3, where (a) is unmodified resin, (b) is 3% graphite particles, (c) is 3% rubber elastomer particles, and (d) is 3% silica particles.

Figure 3:
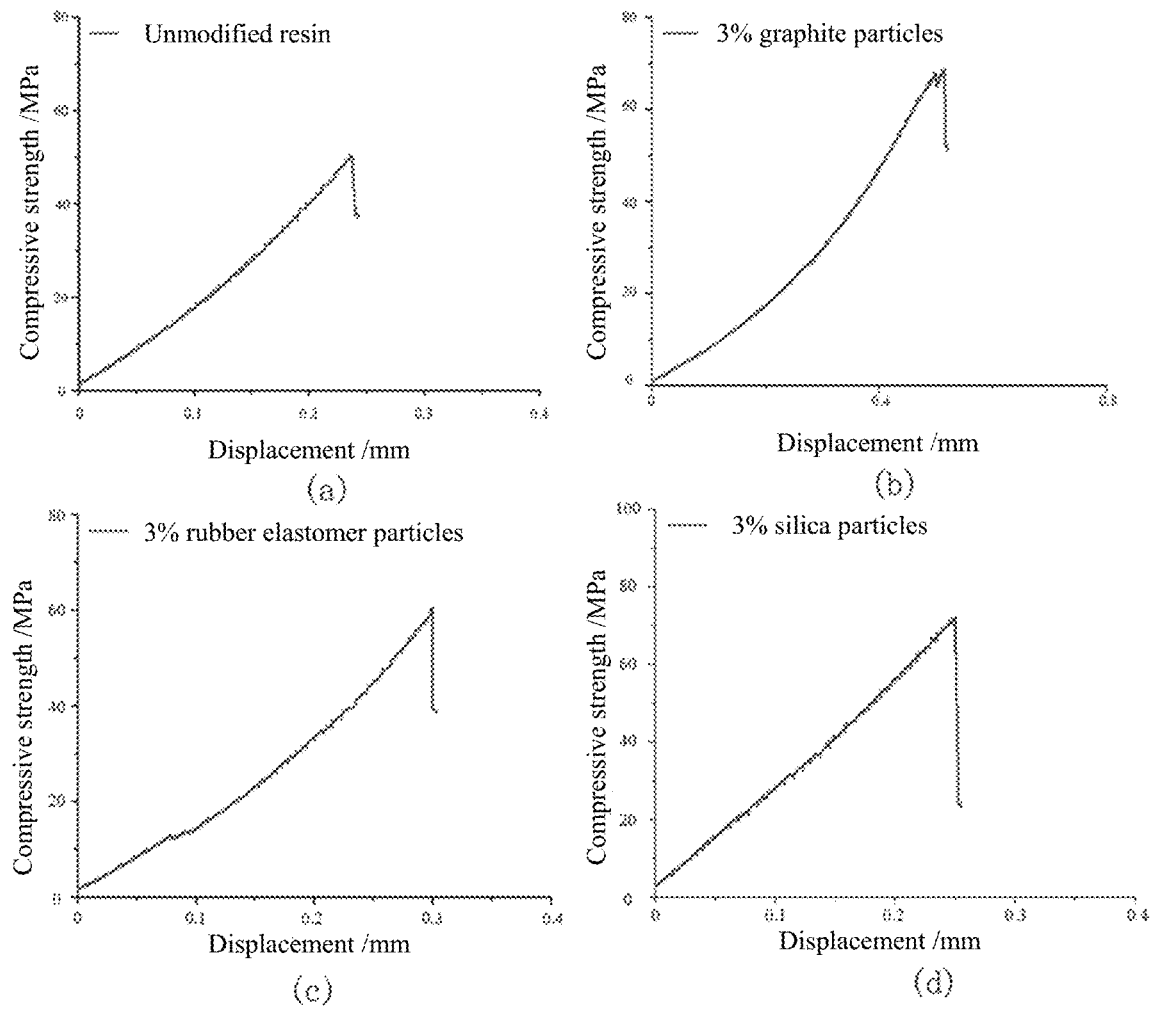
FIG. 3 is a graph illustrating the compressive strength evaluation of the bio-based epoxy resin modified by different materials according to some embodiments of the present disclosure.

As shown in FIG. 3, the compressive strength of the resin after elasticity, rigid material is added has all been improved, and the compressive strength of the resin with rubber elastomer particles increased to 60.3 MPa from 50.8 MPa, and the compressive strength of the resin with rigid graphite particles and silica particles increased to 72.1 MPa and 73.5 MPa, respectively, indicating that the toughening effect of rigid particles on the epoxy resin is higher than that of organic fillers. At the same time, the displacements of the resins toughened by graphite particles and silica particles under compression are 0.55 mm and 0.21 mm, respectively, which indicates that the resin toughened by graphite particles has better toughness while the compressive strength is close to that of the resin toughened by silica particles.

Figure 4:
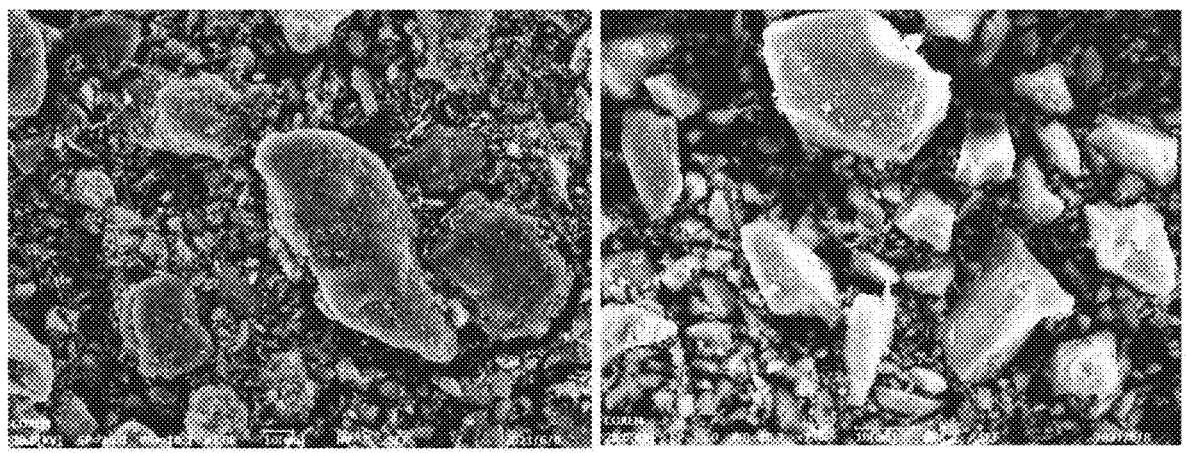
FIG. 4 is a graph illustrating the particle morphology of graphite and silicon dioxide according to some embodiments of the present disclosure.

FIG. 4 is the particle morphology of graphite and silica particles, wherein (a) is graphite, (b) is silica. The better toughness of the resin toughened by graphite particles is due to the higher sphericity of graphite particle morphology compared with silica, which reduces the appearance of particle agglomerates and distributes more uniformly in the resin, thus resulting in better toughness. When used as a proppant, the resin toughened by graphite particles can also effectively prop up fractures when dealing with higher closing pressure, so graphite particles are selected as the material for performing the toughening modification on the prepared bio-based epoxy resin.

(2) Optimization of toughening material formulation system.

Through the evaluation experiment, it is found that the graphite particles have a good effect on performing the toughening modification on the resin material, and significantly improve the compressive strength and toughness of the resin material. To obtain a better concentration of the graphite particles, the compressive strength of resin materials containing different concentrations of graphite particles is analyzed, the influence mechanism of graphite concentration on compressive strength of resin materials is analyzed according to the microscopic surface morphology of the resin, and the evaluation results are shown in FIG. 5.

Figure 6:
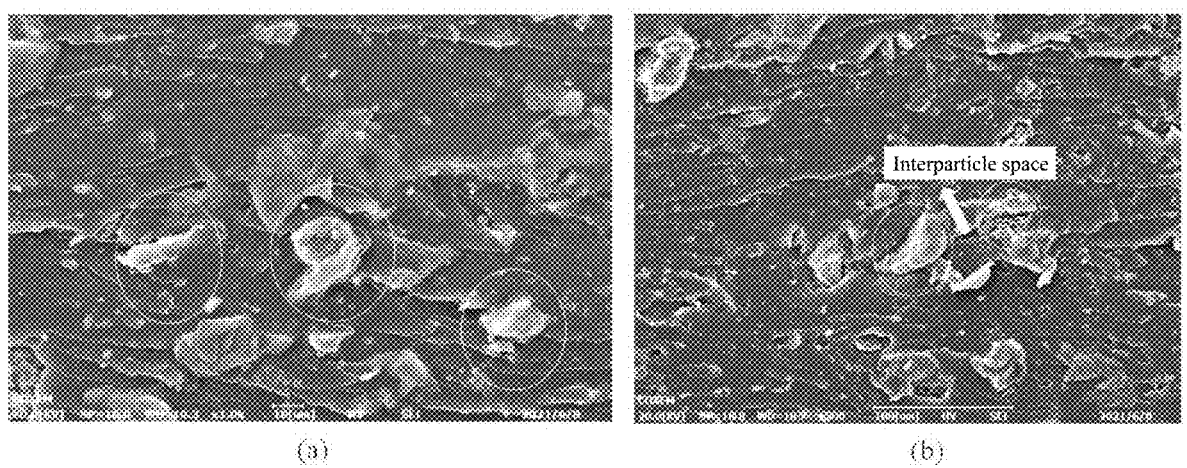
FIG. 6 is a graph illustrating the structural form of the bio-based epoxy resin that prepared by graphite particles with different concentration according to some embodiments of the present disclosure.

As may be seen from the compressive strength of resins containing different concentrations of graphite particles in FIG. 5, when the mass concentration of graphite particles is lower than 5%, the compressive strength of the bio-based epoxy resin increases with the increase of the mass concentration of graphite particles. The mass concentration of graphite particles increased from 0% to 5%, and the compressive strength of the bio-based epoxy resin increased from 50.8 MPa to 74.0 MPa. However, as the mass concentration of graphite particles continues to increase, the compressive strength of the bio-based epoxy resins decreases. When the mass concentration of graphite particles increased to 7%, the compressive strength of the bio-based epoxy resin decreases to 70.3 MPa. According to the structural form of the bio-based epoxy resin that prepared by graphite particles with different concentration, it is known that the reduction in the compressive strength of the resin is due to excessive packing of particles. As shown in FIG. 6, where (a) and (b) correspond to graphite particle concentrations of 5% and 7%, respectively. It may be seen from FIG. 6 that the low-concentration graphite particles are uniformly distributed in the resin. At this time, the graphite particles may restrain the deformation of the resin by restricting the movement of the molecular chains of the adjacent resin matrix. When the concentration of graphite particles increases, due to the poor wettability between graphite particles and epoxy resin and the limitation of the irregular morphology of graphite particles, it may lead to the appearance of graphite particle agglomerates in the resin and the appearance of small holes without resin filling between the particles of the agglomerates, resulting in a decrease in the strength of the resin. Therefore, the concentration of the graphite particles used should be lower than 5%, and the graphite particles with a concentration of 3% are selected finally for considering the performance and use cost.

Embodiment 3: Preparation of the self-phase change proppant.

Figure 7:
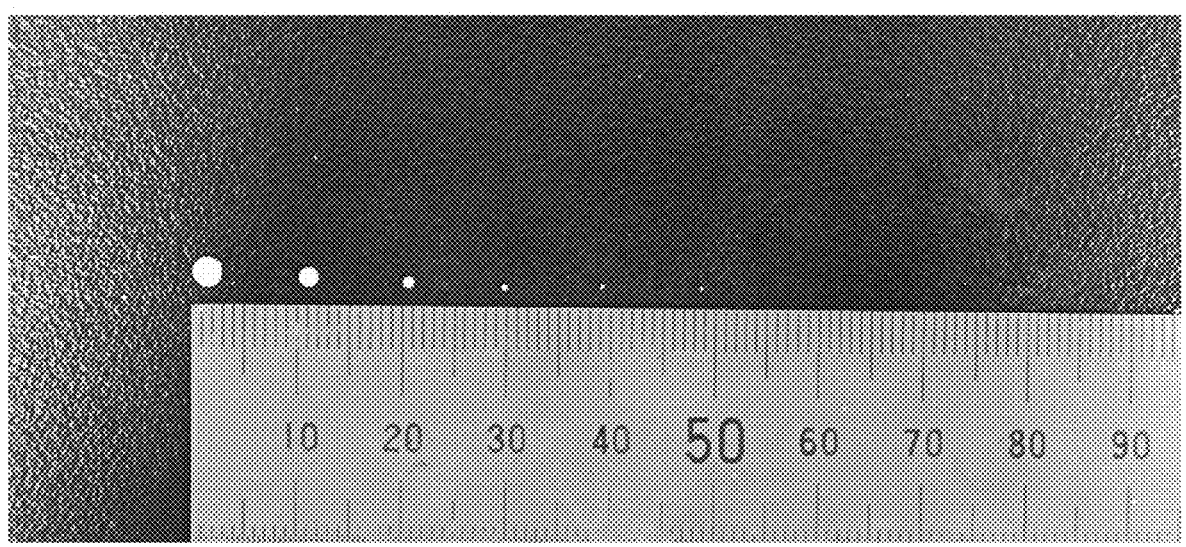
FIG. 7 is a schematic diagram illustrating different particle sizes of the proppant according to some embodiments of the present disclosure.

The self-phase change proppant is prepared by Pickering emulsification technology using $SiO_2$ particles with a particle size of 50 nm as the emulsifier. When the concentration of emulsifier is 0.5%, 6 kinds of bio-based epoxy resin proppants with different particle sizes are mainly formed. As shown in FIG. 7, the proppant particle sizes are 2.9 mm (7 mesh), 1.7 mm (12 mesh), 0.95 mm (20 mesh), 0.6 mm (30 mesh), 0.4 mm (40 mesh) and 0.18 mm (80 mesh), which can meet the requirements of proppant mesh for propping up the near-well fractures, main fractures and branch fractures at the same time.

Figure 8:
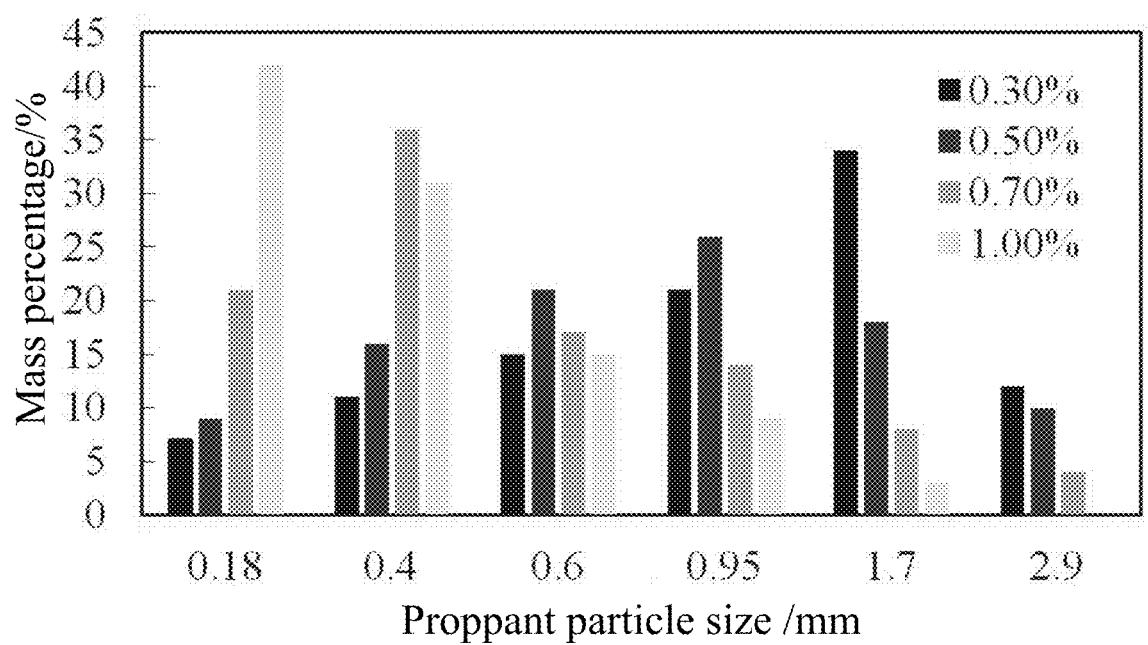
FIG. 8 is a graph illustrating the particle size distribution of the proppant that is prepared by the emulsifier with different concentrations according to some embodiments of the present disclosure.

To make the prepared proppant suitable for different reservoir environments, the particle size distribution of the proppant prepared with different emulsifier concentrations is analyzed by changing the concentration of the emulsifier. The particle size distribution of the proppant prepared with the emulsifier concentration of 0.3%, 0.5%, 0.7% and 1% is evaluated by the proppant mass percentage, and the evaluation results are shown in FIG. 8.

According to the evaluation results, the average particle size of the self-phase change proppant decreases with the increase of the emulsifier concentration. When the emulsifier concentration is 0.3%, the self-phase change proppant with the largest proportion is the 12-mesh self-phase change proppant. When the emulsifier concentration rises to 0.7%, the 20-mesh self-phase change proppant occupies the largest proportion. When the emulsifier concentration is 1%, the largest proportion becomes the self-phase change proppant with a particle size of 80 mesh. Therefore, in the application process, the self-phase change proppant with different mesh numbers may be obtained by selecting the emulsifier concentration according to the site requirements.

Embodiment 4: evaluation of the effect of the prepared proppant.

(1) Evaluation of the migration ability of liquid phase proppant.

To study the migration and sedimentation ability of the prepared liquid phase proppant in fractures and the effect of different fracturing fluid viscosities on the migration ability of the prepared liquid phase proppant, three sets of comparative experiments are designed. The migration ability of the prepared proppant is evaluated using a visualized sedimentation and migration device, and the specific experimental scheme is shown in Table 2.

TABLE 2

Design of migration and sedimentation experiments of the proppant

| No. | Displacement/m³/h | Sand ratio/% | Fracturing fluid viscosity/mPa · s |
|---|---|---|---|
| 1 | 5.4 | 10 | 1 |
| 2 | 5.4 | 10 | 5 |
| 3 | 5.4 | 10 | 25 |

Figure 9:
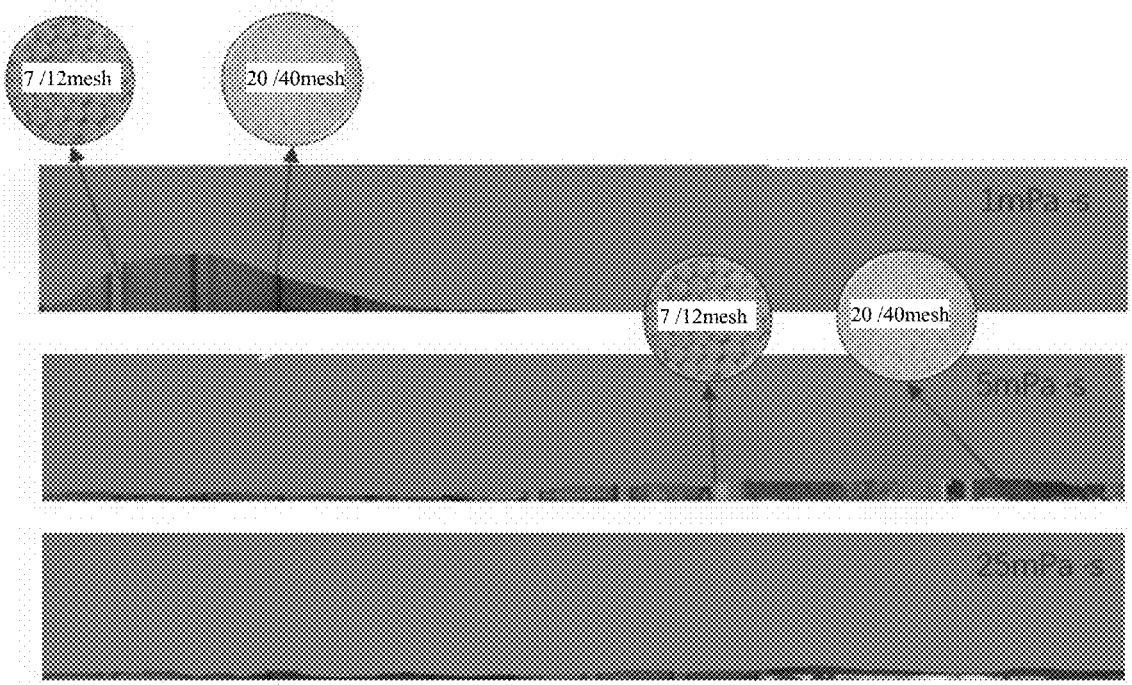
FIG. 9 is a result graph illustrating proppant migration and sedimentation experiments according to some embodiments of the present disclosure.
Figure 10:
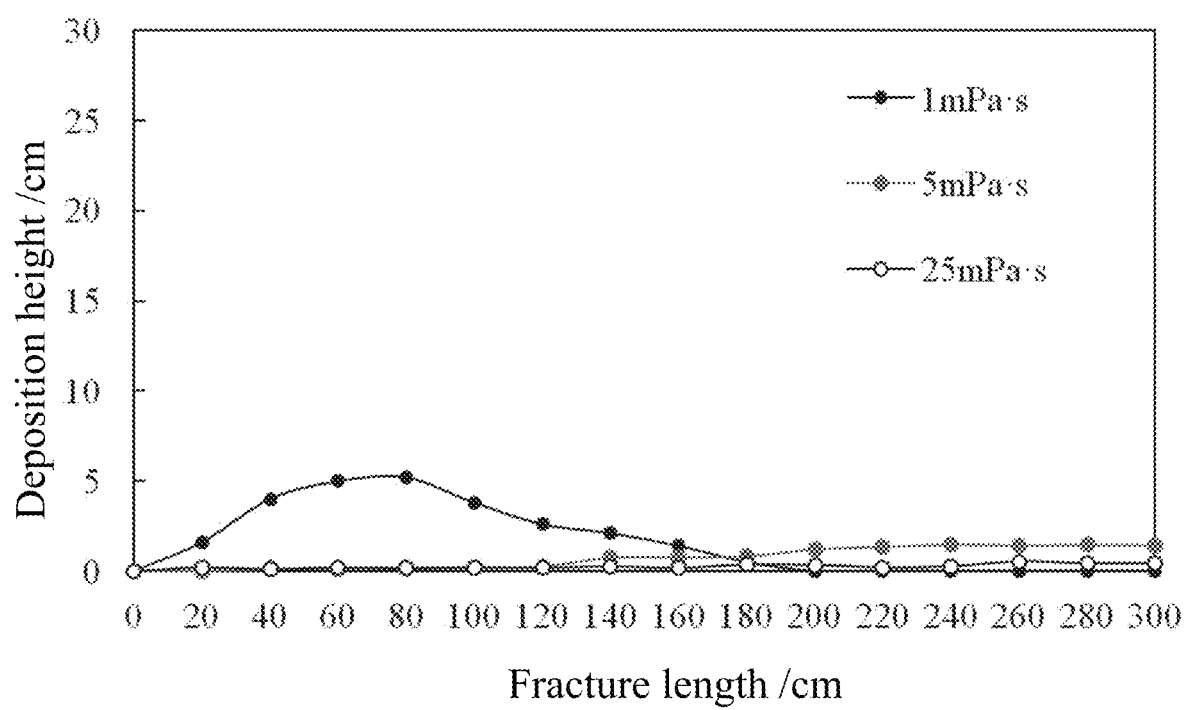
FIG. 10 is a graph illustrating the relationship between fracture length and deposition height under fracturing fluid with different viscosities in the proppant migration and sedimentation experiments according to some embodiments of the present disclosure.

Evaluation experiment result is shown in FIG. 9 and FIG. 10. It may be seen from the evaluation experimental results that the liquid phase proppants prepared in some embodiments of the present disclosure have good migration ability and may achieve the effect of being laid in different sections (e.g., different types of fractures, reservoir, etc.). When the fracturing fluid viscosity is 1 mPa·s and the fracturing fluid displacement is 5.4 m³/s, the 7-mesh and 12-mesh proppants with large particle sizes sediment rapidly in the near-well reservoir, and then the 20/40-mesh proppant sediments to prop up the main fractures, but the 80-mesh small particle size proppant does not sediment, indicating that the proppant may be effectively carried by the low-viscosity fracturing fluid to achieve the effect of being laid in different sections. The small particle size proppant may effectively prop up the distal fractures and branch fractures, and the rapid sedimentation of the large particle size proppant may also prevent the blockage of the tiny fractures. When the viscosity of fracturing fluid increases, the migration ability of liquid phase proppant changes significantly. When the viscosity of the fracturing fluid is 5 mPa·s, the 7-mesh, 12-mesh and 20/40-mesh proppants may all migrate to the main fractures and distal fractures, and the sedimentation in the near-well reservoir is significantly reduced. When the viscosity of the fracturing fluid increased to 25 mPa·s, the liquid phase proppant does not show obvious sedimentation, indicating that increasing the viscosity of the fracturing fluid may significantly increase the migration ability of the liquid phase proppant. It can be obtained from the evaluation experiment that the proppant placement position may be controlled by controlling the viscosity of the fracturing fluid according to the length of the fracture in the field, to achieve the optimal propping effect.

(2) Evaluation of the fracture permeability of curing phase change proppant.

Figure 11:
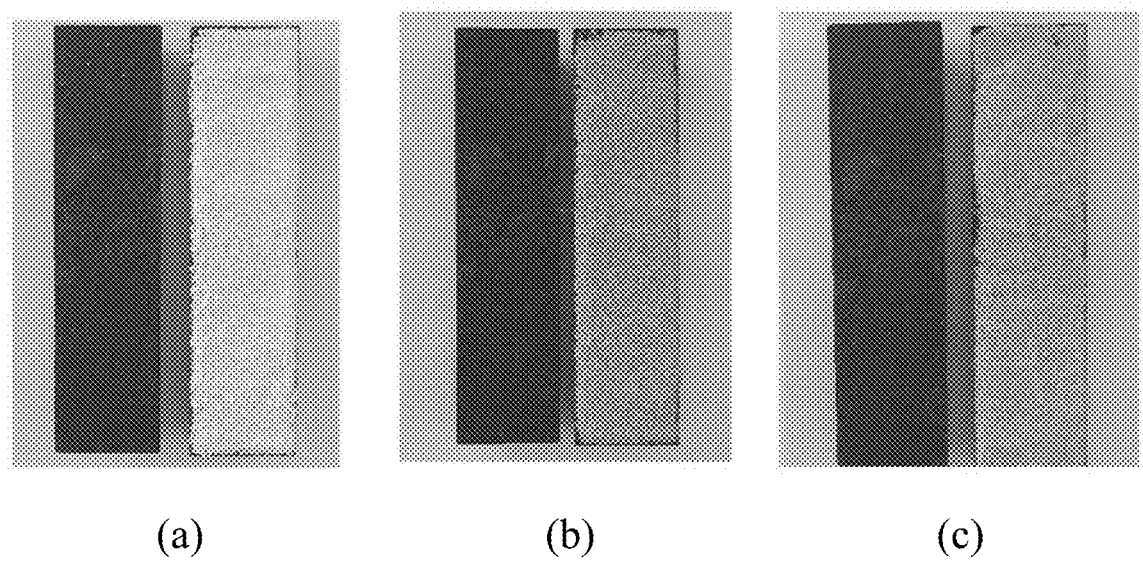
FIG. 11 is a schematic diagram illustrating experimental samples of curing phase change proppant, ceramsite and quartz sand according to some embodiments of the present disclosure.

The fracture permeability of 40/70-mesh curing phase change proppant, ceramsite proppant and quartz sand proppant obtained under different closing pressures are evaluated and tested by using high temperature hydraulic fracturing and seepage simulation device, respectively, and the particle morphologies of different proppants are observed. The experimental device used to evaluate the fracture permeability may perform evaluation experiments at a confining pressure of up to 60 MPa. The stainless steel cores produced are spliced by two semi-cylindrical cores, with rough surface fractures at the splices, with a diameter of $2.5 \times 10^{-2}$ m and a length of $1.5 \times 10^{-1}$ m. As shown in FIGS. 11, (a), (b), and (c) are experimental samples of the curing phase change proppant, ceramsite and quartz sand, respectively. The test process is as follows steps.

1, Spreading different types of proppants of the same mass in a single layer uniformly on the core to form coated proppant fractures.

2, The core holder holds the core and places it in the high pressure seepage simulation device.

3, testing the changing trend of fracture permeability of different types of proppants under different closing pressures (5 MPa-50 MPa) and different ambient temperatures (40° C., 60° C., 90° C.).

Figure 12:
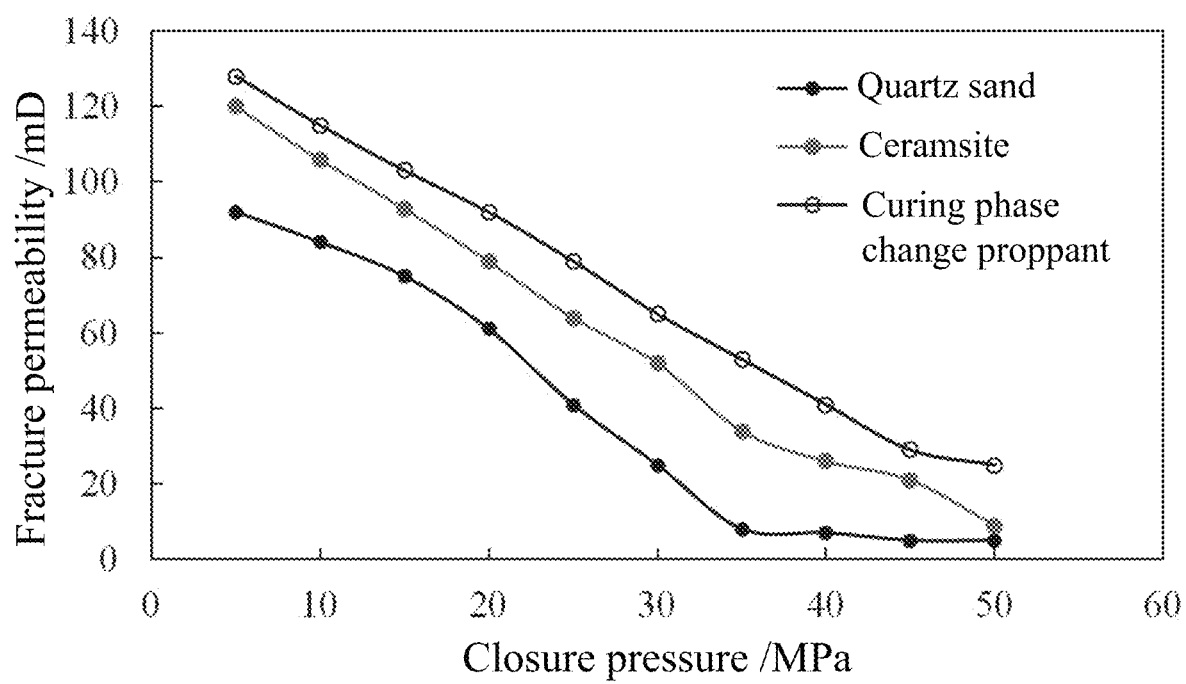
FIG. 12 is a graph illustrating the fracture permeability of different proppants at different closure pressures according to some embodiments of the present disclosure.
Figure 13:
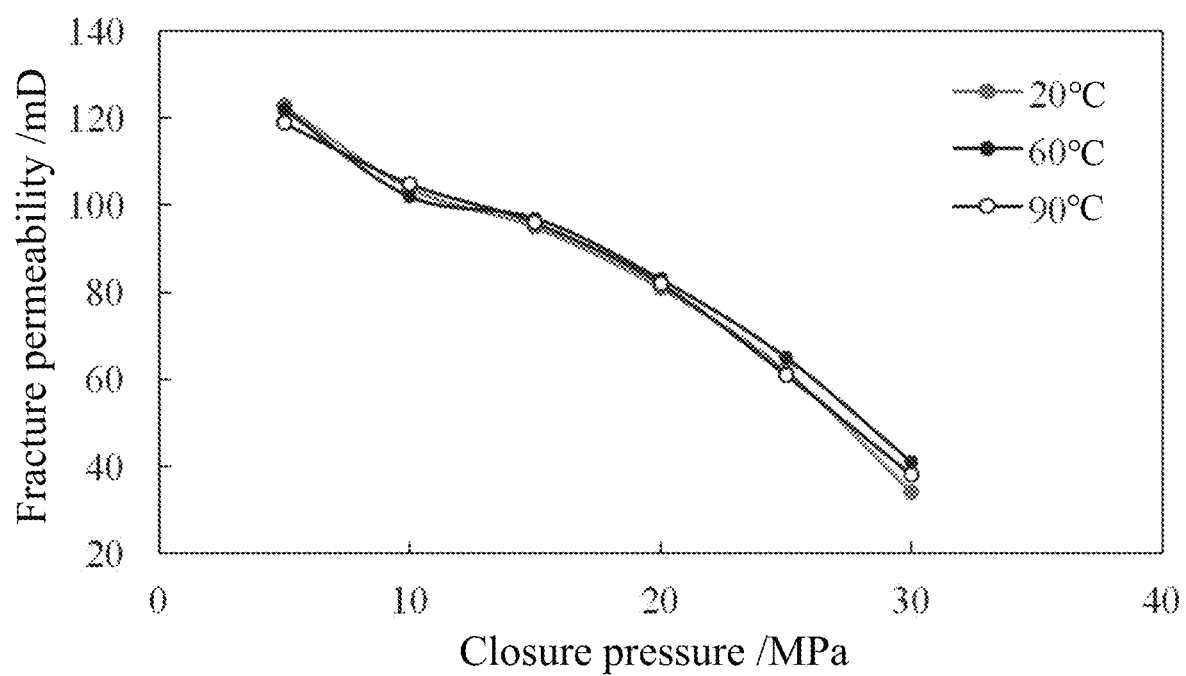
FIG. 13 is a graph illustrating the fracture permeability of curing phase change proppant at different temperatures according to some embodiments of the present disclosure.

The fracture permeability of three different proppants at different closing pressures and the curing phase change proppants at different temperatures are shown in FIG. 12 and FIG. 13, respectively.

Figure 14:
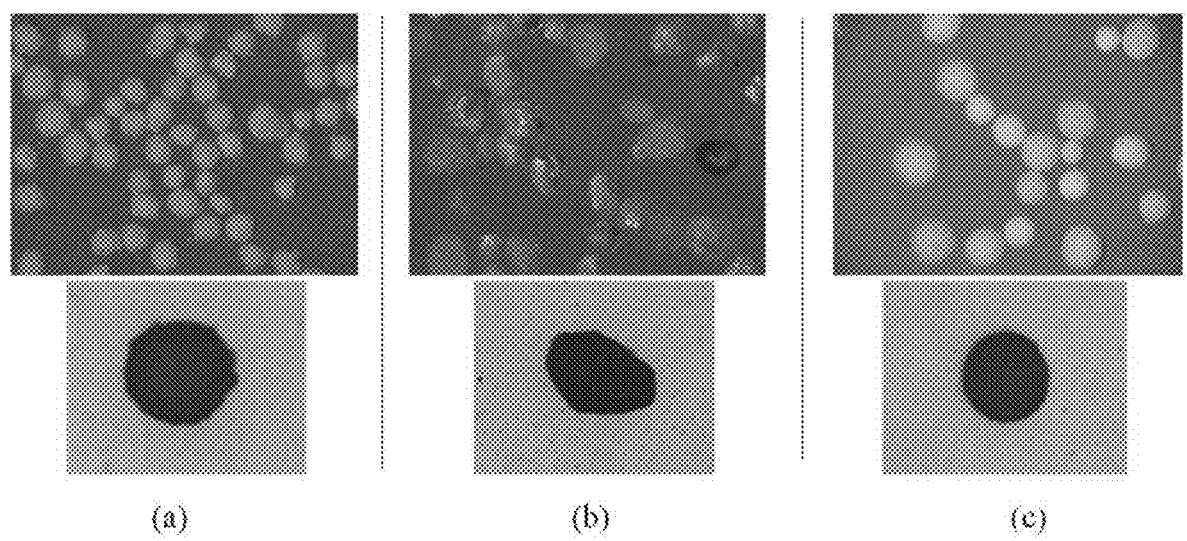
FIG. 14 is a graph illustrating the particle morphology of ceramsite, quartz sand and curing phase change proppant according to some embodiments of the present disclosure.

From the experimental evaluation results of fracture permeability of different proppants, it can be seen that the curing resin proppant has higher fracture permeability than quartz sand and ceramsite, and with the increase of closing pressure, the reduction of the fracture permeability of the curing resin proppant is lower. This is due to the better sphericity of the curing resin proppant. As shown in FIGS. 14, (a), (b), and (c) are the particle morphology of ceramsite, quartz sand and the curing phase change proppant, respectively. With the increase of closing pressure, the accumulation mode of quartz sand and ceramsite with lower sphericity changed due to the pressure. When the closing pressure increases to 35 MPa and 50 MPa, the fracture permeability of quartz sand and ceramsite decrease by 68% and 57%, respectively, and the large decrease of fracture permeability is caused by the proppant breakage. However, the fracture permeability of the curing resin proppant does not decrease significantly when the closing pressure is 50 MPa, and as the ambient temperature increases to 90° C., the performance of the curing resin proppant remains stable, indicating that the curing resin proppant has good fracture permeability, compressive strength and temperature resistance, which also reflects that the prepared curing phase change proppant has better fracture conductivity than the conventional solid proppant, and is more suitable for reservoirs in high temperature and high closure stress.

Finally, it should be noted that the above embodiments are only used to illustrate the technical solutions of the present disclosure, but not limitation. Although the present disclosure has been described in detail with reference to the foregoing embodiments, the ordinary skilled in the art should understand that the technical solutions described in the foregoing embodiments can still be modified, or some or all of the technical features thereof can be equivalently replaced. However, these modifications or replacements do not make the essence of the corresponding technical solutions deviate from the scope of the technical solutions of the embodiments of the present disclosure.

What is claimed is:

1. A method of preparing a self-phase change proppant based on an emulsified and toughened bio-based epoxy resin, wherein toughening modification is performed on the bio-based epoxy resin by graphite particles, and then the bio-based epoxy resin after the toughening modification is emulsified by SiO$_2$ (silicon dioxide) particles as an emulsifier to prepare the self-phase change proppant; a proportion of different mesh numbers in the self-phase change proppant is adjusted by changing a concentration of the emulsifier during emulsification; and the chemical formula of the bio-based epoxy resin is:

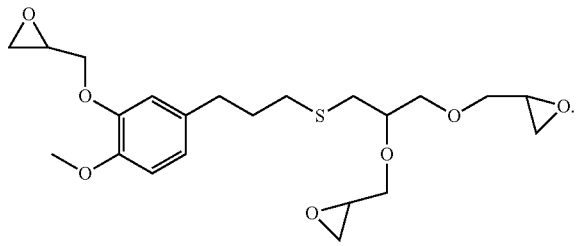 [SMILES: COc1ccc(CCCSCC(COCC2CO2)OCC2CO2)cc1OCC1CO1]

2. The method of claim 1, comprising:
S1, preparing the bio-based epoxy resin;
S2, performing the toughening modification on the bio-based epoxy resin by using the graphite particles; and
S3, using the SiO$_2$ particles as the emulsifier to emulsify the bio-based epoxy resin after the toughening modification to prepare the self-phase change proppant that is laid in different sections.

3. The method of claim 2, wherein a mass concentration of the graphite particles in step S2 is 1%-7%.

4. The method of claim 2, wherein a mass concentration of the graphite particles in step S2 is 1%-5%.

5. The method of claim 2, wherein a mass concentration of the graphite particles in step S2 is 3%.

6. The method of claim 2, wherein an average particle size of the graphite particles in step S2 is 40 μm.

7. The method of claim 2, wherein a particle size of the SiO$_2$ particles in step S3 is 50 nm.

8. The method of claim 1, wherein a preparation process of the bio-based epoxy resin includes:
S101, using dimethyl sulfoxide as a solvent, placing eugenol and 1-thioglycerol with a molar ratio of 1:1 and a catalyst 4-dimethylaminopyridine (DMAP) with a total mass of 2% of the reaction monomerseugenol and 1-thioglycerol in the solvent, and heating them at 65° C. for 4 h to obtain a first product;
S102, reacting the first product and epichlorohydrin in an ethanol solution with a NaOH mass concentration of 10% at 85° C. for 6 h to obtain a second product, wherein the reaction formula is:

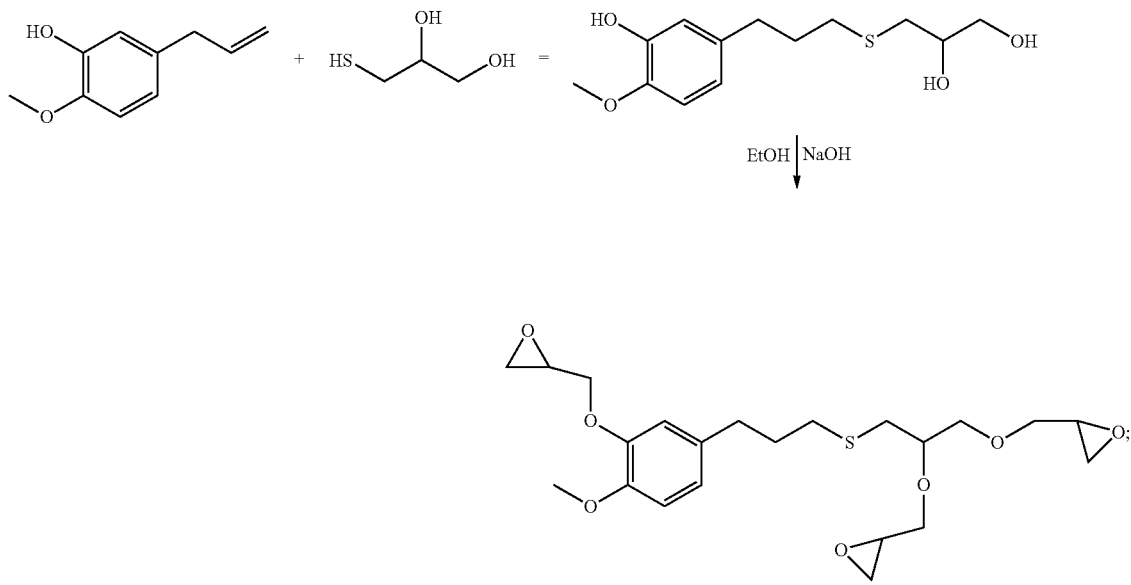

and

S103, using a saturated sodium bicarbonate solution to purify the second product to obtain the bio-based epoxy resin.

9. The method of claim 1, wherein a viscosity and a density of the bio-based epoxy resin at 20° C. are 4620 mPa·s and 1.2 g/cm$^3$, respectively.

\* \* \* \* \*